Oct. 26, 1965   W. B. KEETON   3,213,736
CUTTER FOR PICTURE FRAME MATS
Filed Oct. 16, 1963   2 Sheets-Sheet 1
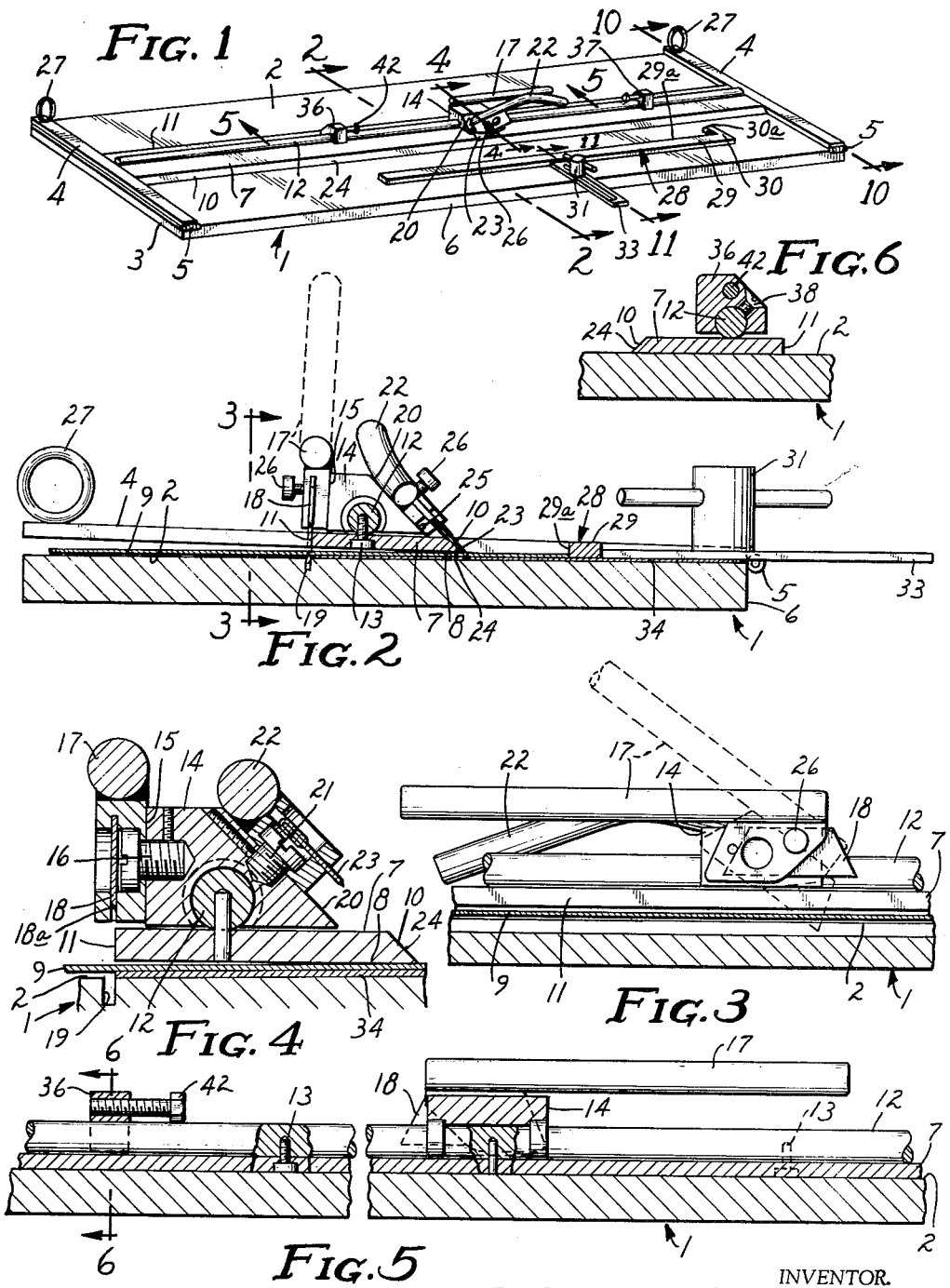
INVENTOR.
WILLIAM B. KEETON
BY
Merchant, Merchant + Gould
ATTORNEYS

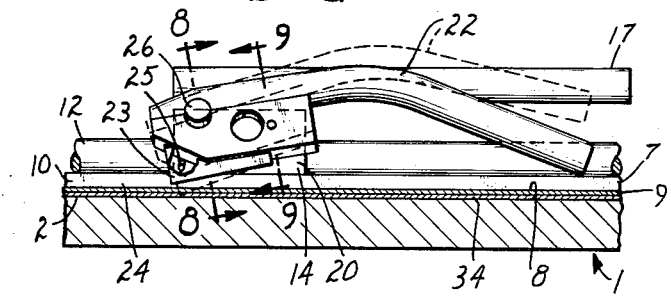 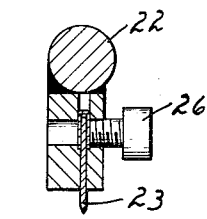 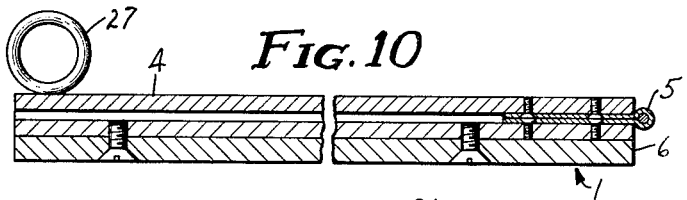 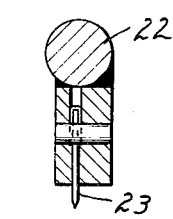 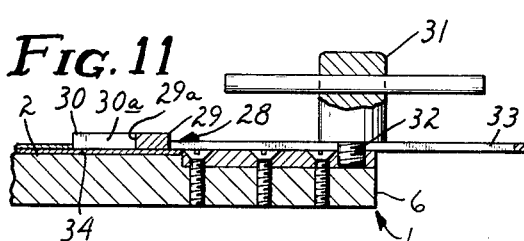 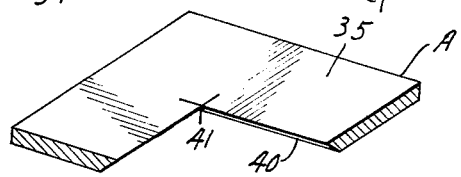 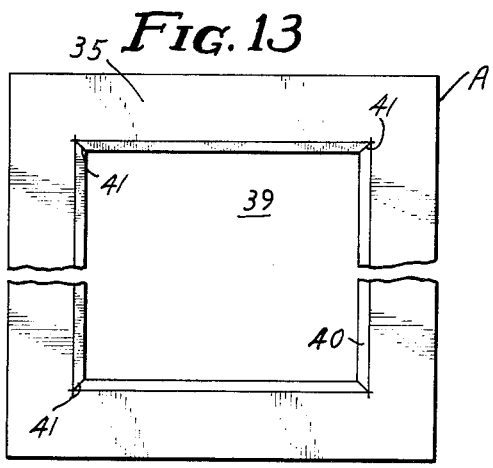 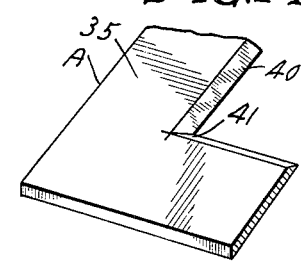

United States Patent Office 3,213,736
Patented Oct. 26, 1965

3,213,736
CUTTER FOR PICTURE FRAME MATS
William B. Keeton, 605 Duling St., Jackson, Miss.
Filed Oct. 16, 1963, Ser. No. 316,727
2 Claims. (Cl. 83—455)

My invention relates generally to the picture-framing art, and more particularly to the provision of a novel and highly efficient cutter for mats conventionally used in the framing of pictures.

Mats of the above type are frequently formed from decorative carboard or other paper stock, and the problem is to form a neat, accurate rectangular opening therein about the picture being framed. Because of the vast range of sizes of such openings, depending upon sizes of the picture being framed, it is highly desirable that any mechanical device utilized for this purpose must be quickly and accurately adjusted.

The primary object of my invention is the provision of a device of the class above described which may be quickly and accurately adjusted and which is relatively foolproof in its operation.

A further object of my invention is the provision of a device of the class immediately above described which incorporates but a minimum of working parts and requires a minimum of manual dexterity to operate.

A further object of my invention is the provision of a device of the class above described which is relatively small and light in weight so as to facilitate handling and storage, and is not unduly expensive to produce.

A further object of my invention is the provision of a device of the class above described which may be maintained and serviced with a minimum of skill and expense.

The above and still further objects of my invention will become apparent from the following detailed specification, appended claims, and attached drawings.

Referring to the drawings wherein like characters indicate like parts throughout the several views:

FIG. 1 is a view in perspective of my novel device;

FIG. 2 is an enlarged view in transverse section as seen from the line 2—2 of FIG. 1;

FIG. 3 is a fragmentary view in section as seen from the line 3—3 of FIG. 2;

FIG. 4 is a fragmentary sectional view on an enlarged scale as seen from the line 4—4 of FIG. 1;

FIG. 5 is an enlarged view in longitudinal section as seen from the line 5—5 of FIG. 1, some parts being broken away;

FIG. 6 is a fragmentary sectional view as seen from the line 6—6 of FIG. 5;

FIG. 7 is a fragmentary view in elevation of a portion of FIG. 1 on an enlarged scale;

FIG. 8 is a fragmentary sectional view as seen from the line 8—8 of FIG. 7;

FIG. 9 is an enlarged fragmentary sectional view as seen from the line 9—9 of FIG. 7;

FIG. 10 is a sectional view as seen from the line 10—10 of FIG. 1, on an enlarged scale;

FIG. 11 is an enlarged view in section as seen from the line 11—11 of FIG. 1;

FIG. 12 is a view in plan of a framing mat cut with my novel cutter;

FIG. 13 is an enlarged fragmentary view in perspective of a corner portion of the mat shown in FIG. 12, showing the back side thereof; and FIG. 14 is similar to FIG. 13, but showing the front side thereof.

Referring with greater particularity to the drawings, the numeral 1 indicates a generally rectangular baseboard defining a horizontally disposed planar work-supporting surface 2. Disposed along opposite ends 3 of the baseboard 1 in parallel relationship to each other are a pair of arms 4. As shown, the arms 4 are hingedly secured at 5 adjacent one longitudinal edge 6 of the baseboard 1 with the axes thereof in the plane of said work-supporting surface 2. Interposed between the intermediate portions of the arms 4 and cooperating therewith to define a clamp means is a tie-bar 7. As shown particularly in FIGS. 2 and 4, the tie-bar 7 is formed on its underside to define a flat work-engaging surface 8. However, in order to concentrate clamping pressure on a worksheet 9 (from which conventional mats are formed), the tie-bar 7 is so disposed that it exerts initial pressure only adjacent the longitudinal edge 10 thereof.

Superimposed upon the tie-bar 7 and extending longitudinally thereof intermediate opposite side edges 10, 11, is a guide rail 12. As shown particularly in FIGS. 2 and 5, longitudinally spaced counter-sunk bolts 13 projecting upwardly through the tie-bar 7 retain the guide rail 12 securely operative position. Mounted for longitudinal sliding movements on the guide rail 12 is a block-like head 14.

Pivotally secured as at 16 to the side 15 of the head 14 adjacent the vertically disposed guide-acting edge 11 of the tie-bar 7 is a lever 17. Lever 17 is equipped at one end with a suitable cutting blade 18, which, for purposes of ready replaceability, is preferably in the nature of a single-edge blade, known by the trade name "Stanley blade." It will be observed by reference to FIG. 4 that the baseboard 1 is provided with an upwardly opening longitudinally extended slot 19 for reception of the cutting edge of the blade 18. To the bevelled opposite side 20 of the head 14 is pivotally secured, as at 21, a lever 22, identical in all respects with lever 17. However, the blade 23 thereof, which may be a conventional single-edge razor blade, is in substantial alignment and in face-to-face engagement with the bevelled guide-acting surface 24 of the edge 10 upon lowering movements of same. It may be noted that the angle of the side 15 of the head 14 may be slightly divergent with respect to the angle of the guide-acting surface 24 if so desired. Under such conditions, tendency of the blade 23 to wander away from said engagement with the guide-acting surface 24 during cutting operations would be greatly reduced. For the purpose of limiting downward movements of lever 22 beyond a point where the cutting blade 23 thereof would enter the work-engaging surface 2 of the baseboard 1, the head 14 is formed to provide a stop member 25 in the nature of a pin which projects outwardly from the bevelled side 20 and is in the path of travel of the lever 22 adjustment the blade 23 thereof.

For the purpose of facilitating removal of the blades 18, 23 from their respective levers 17, 22, anchoring screws 26 are provided.

Also mounted on the baseboard 1 in overlying relationship to the work-supporting surface 2 thereof is a squaring fixture 28, which comprises an elongated bar 29 which has a guide surface 29a which is in laterally spaced parallel relation to the guide-acting edge 10 of the tie-bar 7, and a stop finger 30, which has a guide surface 30a which is normal to said edge 10. Adjustment of the fixture 28 toward and away from the tie-bar 7 is achieved through the medium of handle-equipped set-screw 31, the reduced threaded end 32 of which extends through a slotted arm 33 fast on the bar 29.

When it is desired to cut a mat of a given size and/or dimension, such as identified by the letter A in FIG. 12, the clamp means 4, 7 is elevated by means of lifting rings 27, whereupon a sheet of upsom board 34 or other protective material is first placed upon the work-supporting surface 2. Thereafter, a worksheet 9, from which a mat, such as identified by the letter A in FIG. 12 is to be formed, is placed over the protective sheet 34, with opposed square edges thereof in engagement with the guide surfaces 29a and 30a of the squaring fixture 28. Sizing of the mat A from the worksheet 9 is then accomplished by sliding the head 14 along the guide with the blade 18 associated with the lever 17 in a cutting position. As one side of the mat is cut, the worksheet 9 is turned 90° until all sides are trimmed to size. It may be noted that the blade 18 is bevelled only on one side, as indicated at 18a, whereby to maintain the blade 18 in constant engagement with the guide-acting side edge 11 during cutting movements.

When the mat is exteriorly sized, the fixture 28 is adjusted with respect to the side edge 10 of the tie-bar 7 so as to bring about the desired width of the border 35. Thereafter, the opposed stop members 36, 37 are adjustably secured along the guide rail 12 by set screws 38 so as to center and determine the dimensions of the opening 39 in the mat A. With one corner of the sized mat A received in engagement with the guide surface 29a, 30a, of the fixture 28, the clamping means 4, 7 is lowered and head 14 is moved between the stop members 36, 37 with the blade-equipped lever 22 in its operative cutting position, that is, in alignment with the guide-acting surface 24, whereby to cut a bevelled edge 40 defining the opening 39. To complete the opening 39, the mat A is again merely turned 90°, with one squared corner thereof in operative position with respect to the fixture 28. It will be noted by reference to FIGS. 2 and 7 that the stop element 25 prevents the blade 23 from cutting beyond the protective sheet 34.

Finally, it may be noted that for the purpose of imparting vernier adjustments to the stop elements 36, 37 so as to restrict the amount of overcut at the corners 41, the stop members 36, 37 are provided with threaded abutment screws 42.

My invention has been thoroughly tested and found to be entirely satisfactory for the accomplishment of the above objects; and while I have disclosed a preferred embodiment thereof, my invention may be capable of modification without departure from the scope and spirit of the appended claims.

What is claimed is:
1. A cutter for picture frame mats comprising:
    (a) a generally rectangular baseboard providing a horizontally disposed planar work-supporting surface;
    (b) clamp means carried by said baseboard and adapted to be raised and lowered, said clamp means including
        (1) a pair of laterally spaced generally parallel arms,
        (2) an elongated tie-bar connecting the intermediate portions of said arms and defining a work-engaging undersurface,
        (3) said elongated tie-bar having opposite longitudinal edges which define first and second guide-acting cutting edges, the plane of said first guide-acting cutting edge froming an acute angle with said undersurface and the plane of said second guide-acting cutting edge forming a right angle with said undersurface, and
        (4) means hingedly securing common ends of said pairs of arms to said baseboard on an axis disposed in the plane of said work-supporting surface for forming an acute angle between said work-engaging undersurface of said tie-bar and a mat disposed on said baseboard the apex of which is immediately adjacent said first guide-acting cutting edge when said tie-bar is in the lower or the clamping position;
    (c) a head mounted and guided on said tie-bar for longitudinal sliding movements intermediate and parallel to said guide-acting edges;
    (d) a pair of levers pivotally secured to opposite side portions of said head on axes generally normal to the axis of the sliding movement thereof; and
    (e) said levers having cutting blades on one end which are raised and lowered with respect to said work-supporting surface.

2. A cutter for picture frame mats substantially as set forth in claim 1 wherein the cutting blades in the lowered position are in contact with the guide-acting cutting edges.

References Cited by the Examiner

UNITED STATES PATENTS

| | | | |
|---|---|---|---|
| 231,857 | 8/80 | Smith | 83—455 |
| 611,238 | 9/98 | Drinkaus | 83—455 X |
| 614,407 | 11/98 | Morrison et al. | 83—455 |
| 1,235,459 | 7/17 | Gaffney | 83—455 |
| 1,572,304 | 2/26 | Morton | 83—455 |
| 3,130,622 | 4/64 | Eno | 83—695 X |

ANDREW R. JUHASZ, *Primary Examiner.*

WILLIAM W. DYER, JR., *Examiner.*